United States Patent [19]

King, Jr.

[11] 4,102,030
[45] Jul. 25, 1978

[54] METHOD OF FORMING A SEALING SLEEVE JOINT CONSTRUCTION

[76] Inventor: John O. King, Jr., 3990 N. Ivy Rd., Atlanta, Ga. 30342

[21] Appl. No.: 695,437

[22] Filed: Jun. 14, 1976

Related U.S. Application Data

[63] Continuation-in-part of Ser. No. 378,443, Jul. 12, 1973, Pat. No. 3,962,843, which is a continuation-in-part of Ser. No. 268,478, Jul. 3, 1972, Pat. No. 3,835,615, which is a continuation-in-part of Ser. No. 33,281, Apr. 30, 1970, abandoned, which is a continuation-in-part of Ser. No. 711,368, Mar. 7, 1968, abandoned.

[51] Int. Cl.² .......................... B23P 3/00; B23P 25/00
[52] U.S. Cl. ........................................ 29/458; 29/451;
29/509; 29/523; 29/525; 29/526 R; 85/70;
403/281; 403/408
[58] Field of Search .................. 29/458, 512, 525, 509,
29/526, 522, 451, 446, 523; 151/41.7; 403/282,
281, 408; 85/70, 83; 52/758 F

[56] References Cited

U.S. PATENT DOCUMENTS

| 2,896,684 | 7/1959 | Zahodiakin | 151/41.7 X |
| 2,931,412 | 4/1960 | Wing | 151/41.7 |
| 3,298,144 | 1/1967 | Fischer | 29/458 X |
| 3,298,725 | 1/1967 | Boteler | 403/382 |
| 3,300,798 | 1/1967 | York | 29/523 UX |
| 3,375,670 | 4/1968 | Serota | 29/523 X |

Primary Examiner—Charlie T. Moon
Attorney, Agent, or Firm—B. J. Powell

[57] ABSTRACT

A sleeve member for positioning between the fastener and work pieces within aligned holes through the work pieces. The sleeve member has a tubular side wall with outwardly directed bends formed therein which are partially flattened out during the assembly of the fastener in the work pieces so that the natural resiliency of the sleeve member compensates for discrepancies in the holes and fastener and which may be coated with a sealant prior to assembly so that the bends act as reservoirs for the sealant to insure sealing of the fastener joint.

10 Claims, 12 Drawing Figures

U.S. Patent  July 25, 1978  Sheet 1 of 4  4,102,030
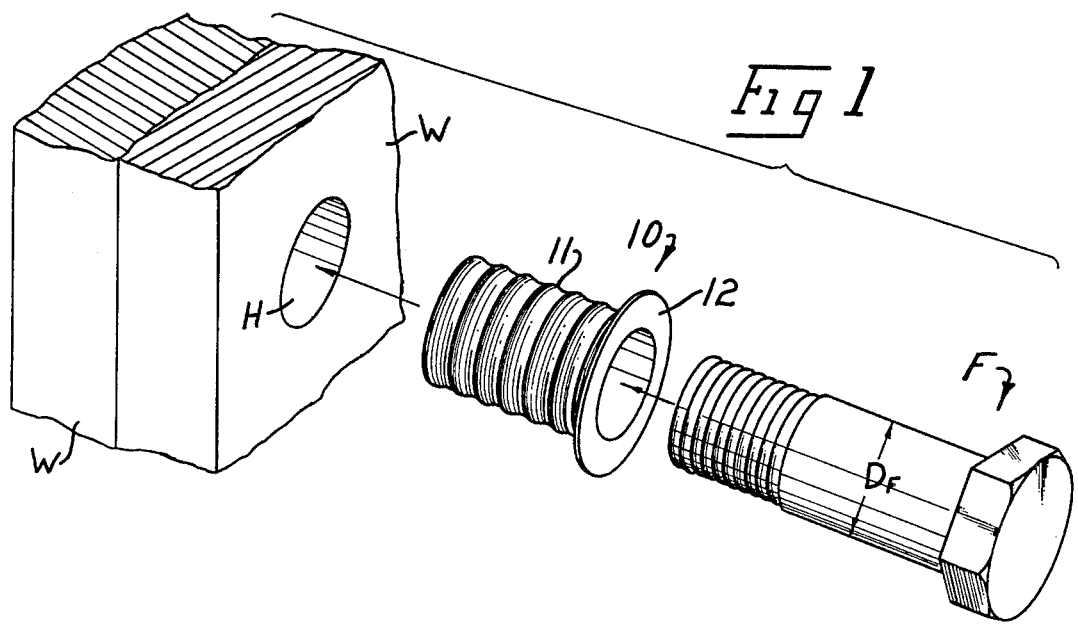
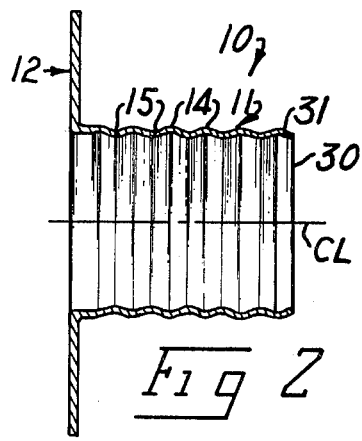
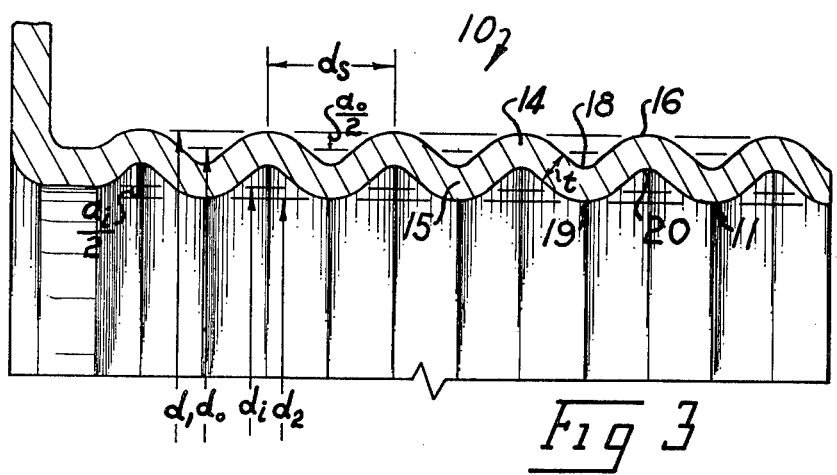

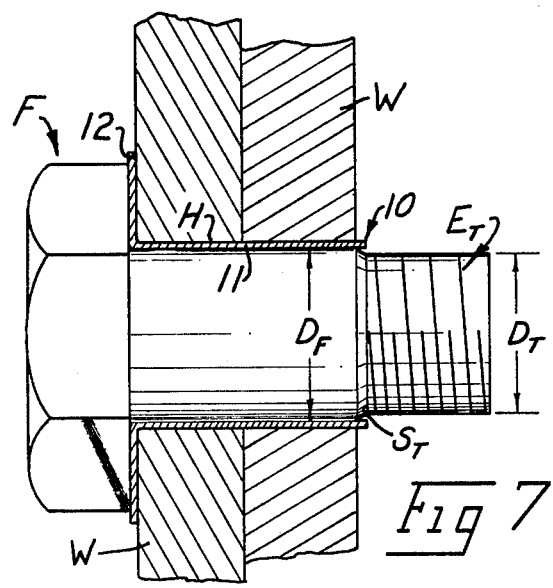
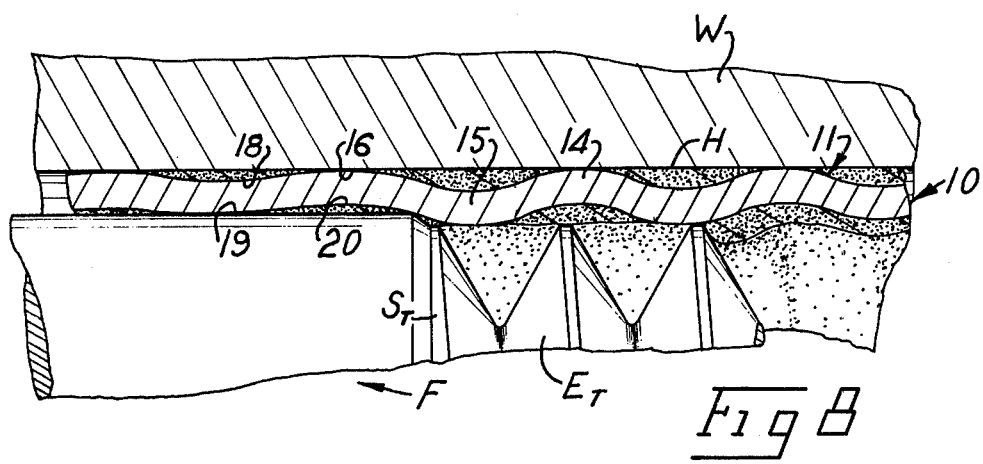

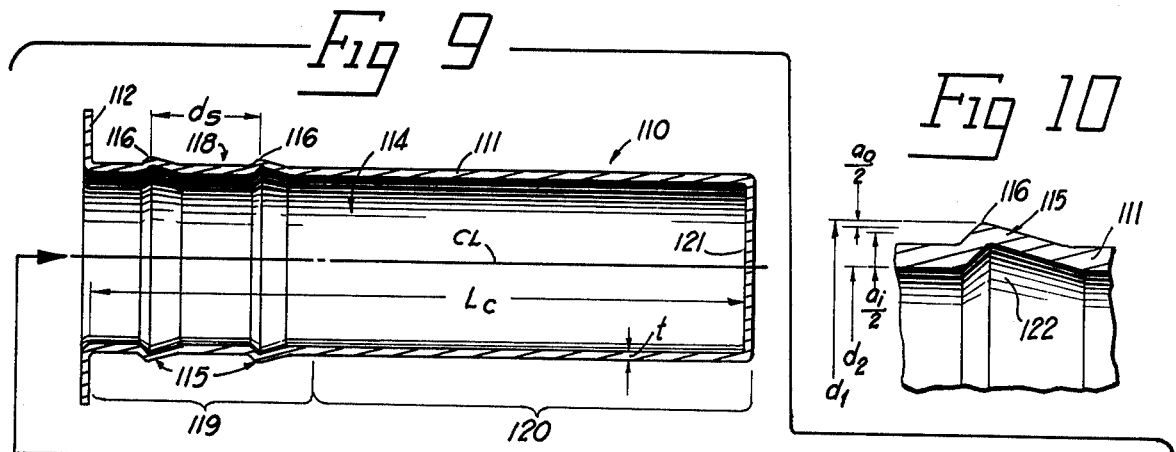
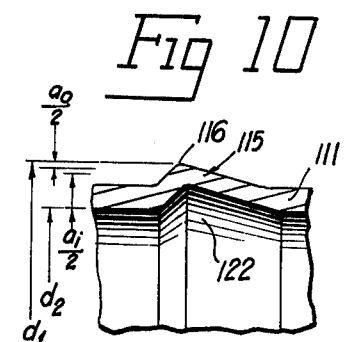
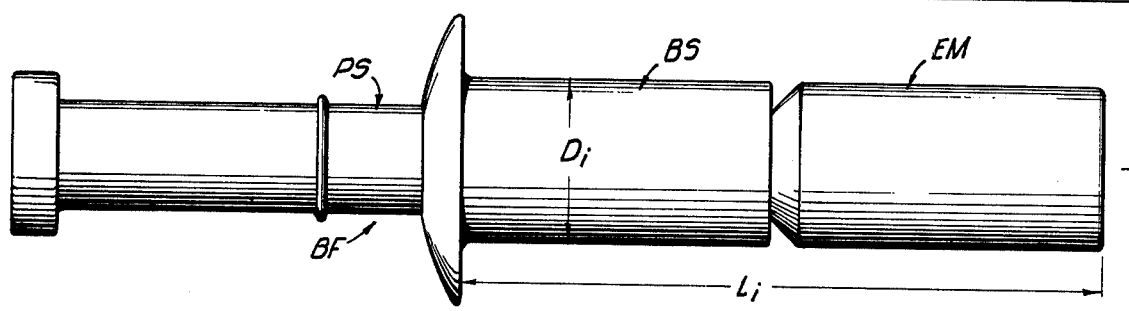
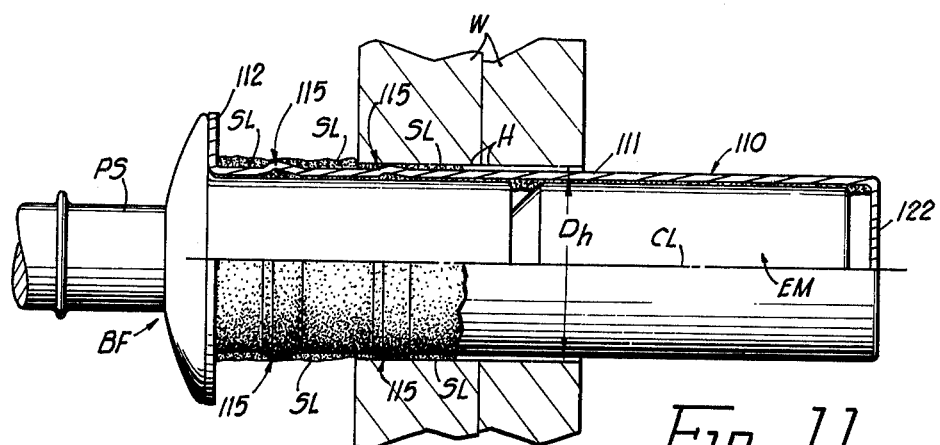
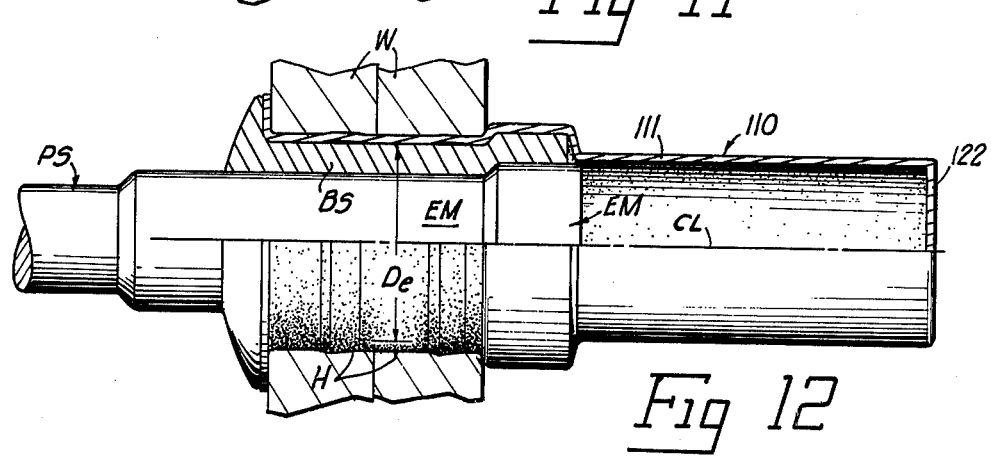

METHOD OF FORMING A SEALING SLEEVE JOINT CONSTRUCTION

CROSS-REFERENCE TO RELATED APPLICATIONS

This application is a continuation-in-part of my co-pending application Ser. No. 378,443, filed July 12, 1973, now U.S. Pat. No. 3,962,843, which is a continuation-in-part of my earlier application, Ser. No. 268,478, filed July 3, 1972 now U.S. Pat. No. 3,835,615, which is a continuation-in-part application of my application Ser. No. 33,281, filed Apr. 30, 1970, now abandoned, which application is a continuation-in-part of my application Ser. No. 711,368, filed Mar. 7, 1968, now abandoned.

BACKGROUND OF THE INVENTION

In certain industries, such as the aerospace industry, tolerances in fastener joints are critical because of the high loads carried by the joint and because the fatigue life of the joint is somewhat dependent on these tolerances. The production equipment actually available in these industries, however, makes these tolerances very difficult, if not impossible, to obtain. While production facilities for fasteners are able to obtain relatively good tolerance ranges, the same has not been true of the hole making operation. This is because the hole forming tool such as a drill or reamer may flex or bend slightly within the holes to make a discrepancy and because the workman may unintentionally vary the angle of the tool with respect to the desired centerline that the formed hole is to have. These discrepancies have generally caused fretting that reduces the fatigue life of the joint. Also, these discrepancies have made it difficult to seal the joint against introduction of a corrosive atmosphere into the joint while in use in the field.

SUMMARY OF THE INVENTION

These and other problems associated with the prior art are overcome by the invention disclosed herein by providing a sleeve member positionable between the holes and the fastener which compensates for the tolerance discrepancies and effectuating a joint which has the desired capabilities of a joint within the desired tolerance range. The member is able to compensate for a wide range of hole and fastener discrepancy ranges so as to insure good joint capability. Moreover, the sleeve member serves to seal the joint against introduction of the corrosive atmosphere to extend the life thereof. Because the sleeve member is resilient and able to absorb the fatigue loading, the fatigue life of the joint is increased.

The sleeve member of the invention has a tubular side wall with an outwardly turned head flange integral with one end thereof. The side wall has outwardly and/or inwardly directed bends formed therein to define a plurality of circumferentially extending external and/or internal ridges and valleys along the length of the side wall. The maximum outside diameter of the sleeve member is greater than the hole diameter while the minimum internal diameter of the sleeve member is less than the installed outside diameter of the fastener so that as the sleeve member is forced into the holes, the bends will be partially flattened and as the fastener is installed, the bends will be further flattened. The natural resiliency of the sleeve allows the sleeve member to fill the space between the fastener and the hole wall and to absorb the fatigue loading and seal the joint. By pre-coating the sleeve member with a sealant, the valleys in the side wall of the sleeve member serve as reservoirs to insure that the sealant will fully seal the joint.

These and other features and advantages of the invention will become more clearly understood upon consideration of the following specification and accompanying drawings wherein like characters of reference designate corresponding parts throughout the several views and in which:

BRIEF DESCRIPTION OF THE DRAWINGS

FIG. 1 is an exploded perspective view showing the use of the invention;

FIG. 2 is a longitudinal cross-sectional view of a sleeve member made in accordance with the invention;

FIG. 3 is an enlarged portion of FIG. 2;

FIG. 7 is a cross-sectional view showing the fastener installed;

FIG. 8 is an enlarged portion of FIG. 7 showing the fastener being installed;

FIG. 9 is an exploded side elevational view illustrating a second embodiment of the invention;

FIG. 10 is an enlarged partial cross-sectional view of the sleeve member of FIG. 9;

FIG. 11 is a cross-sectional view showing the embodiment of FIG. 9 being inserted in holes through work pieces; and, FIG. 12 is a view similar to FIG. 11 after the blind fastener has been expanded for installation.

Figure 4:
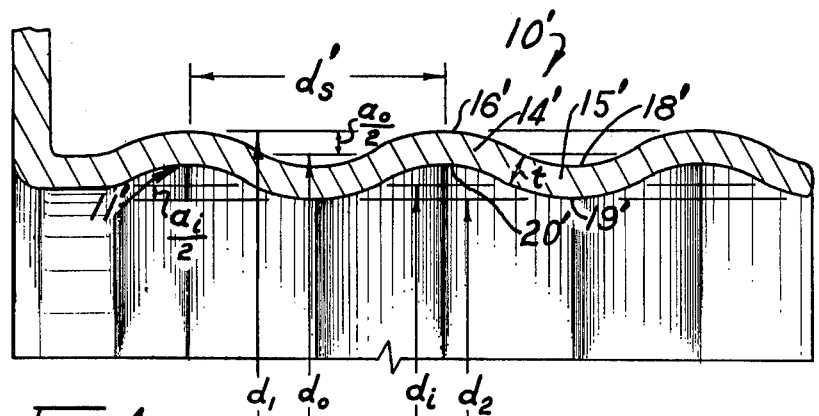
FIG. 4 is a view similar to FIG. 3 showing a different arrangement.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Referring to the figures, it will be seen that the invention includes a sleeve member 10 to be positioned in the holes H of a joint between the fastener F and work pieces W. The sleeve member 10 has the capability of sealing the joint and compensating for discrepancies in both the holes H and fastener F because of its resiliency.

As seen in FIGS. 1–4, the first embodiment of the sleeve member 10 includes a tubular side wall 11 having a centerline CL and an annular head flange 12 at one end of and integral with side wall 11. The head flange 12 may be for an exposed head fastener F as illustrated or a countersunk head fastener. The tubular side wall 11 has a substantially constant thickness t along its length usually in the range of 0.006 inch to 0.016 inch as will become more apparent.

The side wall 11 has formed therein a plurality of outwardly and inwardly extending bends or corrugations 14 and 15 which are circumferentially extending around side wall 11 at longitudinally spaced points therealong. Thus, in longitudinal cross-section, it will be seen that side wall 11 has a sinusoidal or serpentine shape along its length. This forms a series of external ridges 16 and valleys 18 therebetween. Likewise, this also forms a series of internal ridges 19 and valleys 20 therebetween. Because of the constant thickness of side wall 11, it will be seen that the external ridges 16 are longitudinally aligned with the internal valleys 20, and the external valleys 18 are longitudinally aligned with the internal ridges 19. The bends 14 and 15 are illustrated as lying in planes normal to the centerline CL of sleeve member 10, however, other orientations may be used such as helical. The bends 14 and 15 may be formed using conventional roll forming or coining techniques. It will also be noted that the material of the sleeve member is such that it has natural flexing resiliency yet is sufficiently strong to carry loads. While any of a number of different materials may be used, stainless steel has been used satisfactorily.

In order that the sleeve member 10 may be used, the dimensional relationship of both the sleeve member 10, work pieces W and fastener F must be considered. Because the working diameter $D_F$ of fastener F usually is available in standard sizes, the formation of both the sleeve member 10 and holes H are based on diameter $D_F$. The holes H are formed with a nominal diameter $D_H$ which is the fastener diameter $D_F$ plus the thickness $t$ of side wall 11. Because the tools used to form holes H never form a hole smaller than the diameter of the tool, but frequently form holes having portions greater than its diameter, there is no problem of undersize holes. The sleeve member 10 has, prior to the formation of bends 14 and 15, a nominal outside diameter $d_o$ nominally equal to the hole diameter $D_H$ and a nominal inside diameter $d_i$ nominally equal to the working diameter $D_F$ of fastener F. This is assuming of course, that a line-to-line fit is desired. If an interference fit is desired, the hole diameter $D_H$, and possibly the sleeve member diameters $d_o$ and $d_i$, would be appropriately changed as will become more apparent.

The bends 14 and 15 have a maximum outside diameter $d_1$ a prescribed amount $a_o$ larger than the nominal hole diameter $D_H$ and a minimum inside diameter $d_2$ a prescribed amount $a_i$ smaller than the nominal working diameter $D_F$ of fastener F. This is best illustrated in FIG. 3 where one half of the actual amounts $a_o$ and $a_i$ are illustrated. From the above, it will be seen that diameter $d_1$ is greater than the diameter $d_o$ by the amount $a_o$ and diameter $d_2$ is less than diameter $d_i$ by the amount $a_i$. While different values may be used for the amounts $a_o$ and $a_i$, one suggested value for each amount $a_o$ and $a_i$ is approximately 0.004 inch.

The longitudinal spacing $d_s$ between adjacent external bends 14 or between adjacent bends 15 is the same. It will be understood that the spacing $d_s$ may be varied. One suggested spacing $d_s$ shown in FIG. 3 is approximately 1/32 inch while another suggested spacing $d_s'$ shown in FIG. 4 is approximately 1/16 inch. The portions of the sleeve member of FIG. 4 corresponding to those of FIG. 3 are indicated by primes of the reference numbers applied to FIG. 3. It will be understood that sleeve member 10' will be used similarly to sleeve member 10.

In order to insure that the leading end 30 of the sleeve member 10 does not damage the material around holes H, the wall 11 is terminated so that an inwardly directed flange 31 is formed on the end 30 as seen in FIGS. 2 and 3. This insures that a smooth curved surface will always engage the work pieces W about holes H.

OPERATION OF FIRST EMBODIMENT

Figure 5:
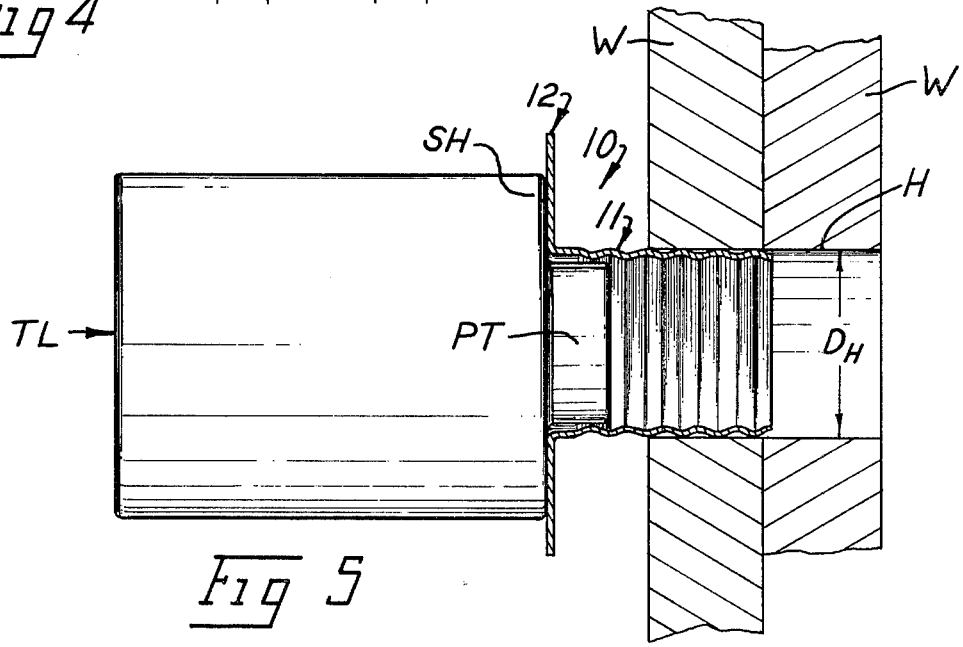
FIG. 5 is a cross-sectional view showing the sleeve member being installed in the holes through the work pieces.

The operation of the first embodiment of the sleeve member 10 can best be seen in FIGS. 5-8. The sleeve member 10 is shown being forced into the holes H in FIGS. 5 and 6. A tool TL may be provided for assisting in forcing the sleeve member 10 into the holes H as seen in FIG. 5. The tool TL has a pilot PT which fits within the side wall 11 with a diameter smaller than the minimum inside diameter $d_2$ of sleeve member 10 and a shoulder SH that engages the head flange 12.

Figure 6:
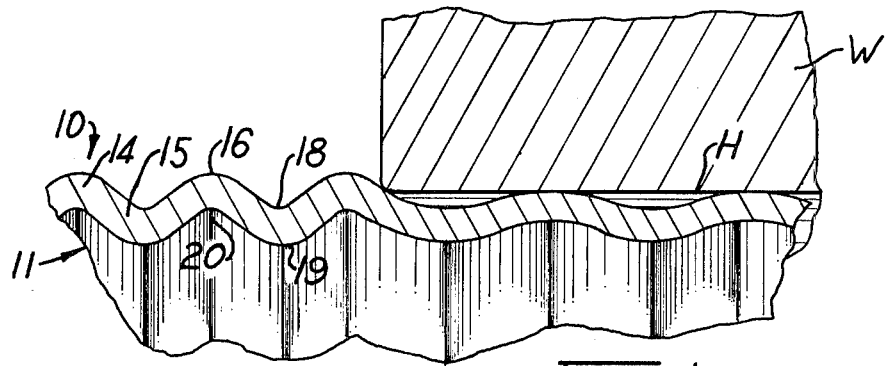
FIG. 6 is an enlarged portion of FIG. 5.

As the sleeve member 10 is forced into holes H as best seen in FIG. 6, it will be seen that the bends 14 and 15 are partially flattened out against the natural resiliency of the material of sleeve member 10. This is because the maximum outside diameter $d_1$ of sleeve member 10 is greater than the diameter $D_H$ of holes H. As the external ridges 16 are forced into holes H, the wiping action of the ridges on the wall of the holes produces a tight seal between the sleeve member 10 and work pieces W within holes H. Usually, the minimum inside diameter $d_2$ is also slightly reduced by this operation, however, the amount of reduction is not sufficient to affect the insertion of fastener F. It will, of course, be understood that the diameter of the pilot PT on tool TL is just sufficiently small to be slidably removed from the sleeve member 10 after it is fully seated in holes H.

Where the material of the sleeve member 10 is of high strength such as stainless steel, it will be seen that considerable force is required to insert the sleeve member 10 into the holes and a considerable outwardly directed force is generated in the work pieces W immediately adjacent the holes H. This serves to smooth out any burrs or other surface impertions in the holes while at the same time slightly coldworking the holes H to improve the fatigue life of the joint. The action also acts to deburr the entrance to hole H as seen in FIG. 6.

The fastener F is shown being inserted into the sleeve member 10 after the sleeve member has been installed in the holes H through the work pieces in FIGS. 7 and 8. The fastener F is shown fully installed in FIG. 7 with the enlarged view in FIG. 8 showing the fastener F being installed. As seen in FIG. 8, it will be noted that the diameter $D_T$ of the engagement portion $E_T$ of the fastener F is a prescribed amount less than the working diameter $D_F$ of the bearing area on the shank of the fastener, usually in the order of 0.003 inch less. A transition surface $S_T$ is provided between the bearing area on the shank of the fastener and the engagement portion $E_T$ of the fastener, here shown as threads. It will thus be seen that the fastener F is installed by first sliding the engagement portion $E_T$ into the sleeve member which serves to orient the fastener and support it while it is being driven into the sleeve member 10. As the fastener F is driven into the sleeve member 10, the transition surface $S_T$ serves to further flatten out the bends 14 and 15 in the sleeve member 10. Because of the allowable tolerance ranges of both the holes H and the fastener F, the bends 14 and 15 are usually not fully flattened out when the fastener F is installed leaving slight undulations in the side wall 11 between the fastener F and work pieces W as seen in the left hand side of FIG. 8. Thus, when a material with a good spring action such as stainless steel is used, the major damaging action of fatigue loading will be absorbed in the sleeve member 10 without damage to the joint in which it is used. It is further to be understood that other materials rather than those with significant spring action may be used for the sleeve member 10 where fatigue loading is not critical but sealing is desired. One such material is aluminum.

From the foregoing, it will be seen that as the bends 14 and 15 in the side wall 11 of sleeve member 10 are flattened out, any discrepancies in the diameter of the holes H or in the working diameter $D_F$ of the fastener F are automatically compensated for. This means that very good bearing contact is always maintained between the work pieces W and the fastener F to insure good joint life.

Because fasteners in the aerospace industry are usually driven after being coated with a sealant, it is anticipated that the sleeve member 10 will usually be coated with a sealant SL as seen in FIG. 8 before installation. The external valleys 18 and internal valleys 20 in the side wall 11 act as reservoirs to hold the sealant therein. As the sleeve member 10 is inserted in the holes, part of the sealant will be retained in the partly flattened external valleys 18 on the outside of the sleeve member 10. Then, as the fastener is inserted in the sleeve member 10, part of the sealant will be retained in the partly flattened internal valleys 20 on the inside of the sleeve member 10. Thus, it will be seen that sealant will fill any of the voids formed by the remaining undulations left in the side wall 11 after the joint is fabricated. Because the sealant is generally incompressible, the entrapped sealant will serve to further strengthen the joint.

It will also be noted that because the sleeve member 10 can be expanded, a fastener with a working diameter larger than that described above may be used to produce an interference fit. The bends 14 and 15 would then serve as anti-rotation devices to prevent the fastener from turning during installation.

SECOND EMBODIMENT

Referring to FIGS. 9-12, a second embodiment of the sleeve member is illustrated and is designated 110. The sleeve member 110 is designed for use specifically with blind expansion fasteners such as blind rivets in which the outside diameter of the fastener is expanded into contact with the holes as an incident to the installation of the fastener. The blind fastener BF in FIG. 9 is a conventional blind rivet, the bearing section BS of which has an initial outside diameter $D_i$ as seen in FIG. 9 and which is expanded out to an expanded diameter $D_e$ as seen in FIG. 12. Usually, the blind fastener has an expansion member EM with a pulling stem PS extending through an appropriate hole in the fastener so that the fastener can be installed from the head side thereof.

As best seen in FIG. 9, the sleeve member 110 includes a tubular side wall 111 having a centerline CL and an annular head flange 112 at one end of and integral with the side wall 111. The side wall 111 has a central passage 114 therein. The head flange 112 fits under the head on the blind fastener BF. The head flange 112 may be for an exposed head type fastener as illustrated or for a countersunk head fastener. The tubular side wall 111 has a substantially constant thickness t along its length usually in the range of 0.006 inch to 0.016 inch similar to the first embodiment thereof. The side wall 111 has a bearing section 119 adjacent the head flange 112 which fits within the holes through the work pieces and an extension section 120 opposite the head flange 112 so that the total length $L_c$ of the side wall 111 is greater than the initial length $L_i$ of the blind fastener BF as seen in FIG. 9. It will further be noted that the leading end of the side wall 111 opposite the head flange 112 is closed by end wall 121 so that the passage 114 in the sleeve member 110 opens through the head flange 112 but is closed at its opposite end by the end wall 121. The bearing section 119 has formed therein a plurality of outwardly extending bends or corrugations 115 which are formed therein circumferentially about the side wall 111 at longitudinally spaced points therealong. The extension section 120 is usually not corrugated. While any number of corrugations 115 may be provided in the bearing section 119 of the side wall 111, two are illustrated. The corrugations 115 form a pair of external ridges 116 which have a maximum outside diameter $d_1$ seen in FIG. 10 a prescribed amount $a_o$ larger than the nominal hole diameter $D_h$ as seen in FIG. 11. The minimum inside diameter $d_2$ seen in FIG. 10 of the bearing section 119 of the side wall 111 is a prescribed amount $a_i$ smaller than the nominal expanded final working diameter $D_e$ of the fastener BF seen in FIG. 12. The minimum inside diameter $d_2$ is usually about equal to or slightly greater than the initial unexpanded diameter $D_i$ of the fastener BF as best seen in FIGS. 9 and 11.

It will also be seen that the outwardly directed corrugations 114 define an external reservoir space 118 therebetween while the inside of the corrugations 114 each define an internal reservoir space 122 therein which is larger in diameter than the inside diameter $d_2$ of the side wall 111. The longitudinal spacing $d_s$ between the corrugations 114 may be varied depending on the number of corrugations 114 in the side wall 111. The spacing $d_s$ illustrated is less than the combined thickness of the work pieces so that both of the corrugations lie within the holes of the work pieces.

OPERATION OF SECOND EMBODIMENT

The operation of the second embodiment of the sleeve member 110 can best be seen in FIGS. 11 and 12. Usually, at least the outside of the sleeve member 110 is coated with a sealant but it is to be understood that both the outside and the inside of the sleeve member 110 can be coated with sealant SL. Usually, the blind fastener BF is inserted within the passage in the side wall 111 until the head of the blind fastener BF is seated against the head flange 112 of the sleeve member 110 as seen in FIG. 11. Then, the blind fastener BF with the sleeve member 110 on the outside thereof is inserted through the holes H in the work pieces W as seen in FIG. 11. It will be noted that as the blind fastener BF is inserted in the sleeve member 110, any excess sealant SL will be removed from the inside of the side wall 111 and forced ahead of the fastener BF. It will also be noted that part of the sealant SL will be retained in the reservoirs 122 formed at the inside of the corrugations 114 in the sleeve side wall 111. Then, as the sleeve member 110 is inserted in the holes H on the fastener BF, it will be seen that the corrugations 114 will be partly flattened out against the natural resiliency of the material of the sleeve member 110. This is because the maximum outside diameter $d_1$ of the corrugations 114 in the sleeve member 110 is greater than the diameter $D_h$ of the holes H. As the corrugations are forced into the holes H, the wiping action of the external ridges 116 on the corrugations 114 on the wall of the holes produces a tight seal between the sleeve member 110 and the work pieces W within the holes. It will also be noted that while some of the sealant will be wiped from the outside of the sleeve member 110, part of the sealant will be retained in the reservoirs 118 between the partly flattened corrugations 114.

After the sleeve member 110 with the fastener BF therein is fully seated in the holes H, the pulling stem PS on the fastener BF is manipulated to pull the expansion member EM into the bearing section BS of the fastener so that the bearing section of the fastener is expanded out to its expanded diameter $D_e$. As the bearing section of the fastener BF is expanded, it will be noted that the side wall 111 will also be expanded. This serves to at least partly flatten out the corrugations 114 in the side wall 111. Because the sealant SL has been positively retained between the outside of the side wall 111 and the hole surface, an adequate layer of sealant will always be maintained between the sleeve member 110 and the holes to insure that the joint is sealed at the holes. Because the end wall 121 of the sleeve member 110 remains intact during and after the expansion operation to finally install the fastener BF, it will be seen that the inside of the sleeve member 110 will likewise be sealed to fully seal the resulting joint.

While specific embodiments of the invention has been disclosed herein, it is to be understood that full use may be made of modifications, substitutions and equivalents without departing from the scope of the inventive concept.

I claim:

1. A method of forming a fastener joint comprising the steps of:
   (a) forcing a sleeve member with a resilient tubular side wall having a predetermined wall thickness and a plurality of generally circumferentially extending resilient bends formed therein, each of the bends lying generally in a transverse plane normal to the centerline of the side wall with the bends axially spaced from each other along the side wall centerline so that the side wall has a first effective major outside diameter and a second effective inside minor diameter where the difference between the first major diameter and the second minor diameter is greater than the wall thickness of the side wall, into holes through work pieces where the holes have a diameter a prescribed amount smaller than the first major outside diameter of the side wall so as to partly resiliently flatten the bends in the side wall of said sleeve member; and,
   (b) installing the bearing area of a fastener in the sleeve member where the final installed diameter of the bearing area of the fastener is larger than the second minor inside diameter of the side wall of the sleeve member to further partly resiliently flatten the bends in the sleeve member and cause each of the bends sealingly engage the hole surface to seal the holes about the fastener.

2. The method of claim 1 wherein the plurality of bends in the side wall of the sleeve member are alternating outwardly and inwardly directed bends and the minor inside diameter is defined by the inwardly directed bends; wherein step (a) includes forcing the side wall into the holes so that both the outwardly and inwardly directed bends are partly resiliently flattened out; and wherein the fastener inserted in step (b) has an engagement section thereon with an outside diameter smaller than the inside diameter of the sleeve side wall after the forcing of the side wall of the sleeve member in the holes, the engagement section of the fastener being inserted through the sleeve member leading the bearing section.

3. The method of claim 2 further including the step of applying a sealant to the outside of the side wall of the sleeve member prior to step (a).

4. The method of claim 2 further including the step of applying sealant to the inside and outside of the side wall of the sleeve member prior to step (a).

5. The method of claim 4 wherein each of the outwardly directed bends in the side wall have substantially the same major outside diameter and wherein each of the inwardly directed bends in the side wall have substantially the same minor inside diameter.

6. The method of claim 4 wherein the outwardly directed bends in the side wall vary from the major outside diameter at one end of the side wall to a minimum outside diameter at the other end of the side wall; wherein the inwardly directed bends in the side wall vary from the minor inside diameter at the one end of the side wall to a maximum inside diameter at the other end of the side wall; therein the holes through the work pieces have a diameter smaller than the minimum outside diameter of the outwardly directed bends in the side wall; and wherein the working diameter of the shank of the fastener is larger than the maximum inside diameter of the inwardly directed bends in the side wall.

7. A method of forming a fastener joint comprising the steps of:
   (a) inserting a headed blind expansion fastener with an expandable bearing section into the passage in a sleeve member until the head on the blind fastener engages the sleeve member where the sleeve member includes a resilient tubular side wall and an end wall integral with one end of the side wall and closing the passage through the side wall, the side wall having a predetermined thickness and a plurality of generally circumferentially extending resilient bends formed therein so that the side wall has a first effective major outside diameter and a second effective inside minor diameter where the difference between the first major diameter and the second minor diameter is greater than the wall thickness of the side wall, and then using the blind fastener to force the side wall of the sleeve member into holes through work pieces where the holes have a diameter a prescribed amount smaller than the first major outside diameter of the side wall so as to partly resiliently flatten the bends in the side wall of the sleeve member; and
   (b) installing the bearing area of the blind fastener in the sleeve member by expanding the expandable bearing section thereof to install the blind fastener and form the joint where the final installed diameter of the expanded bearing area of the fastener is larger than the second minor inside diameter of the side wall of the sleeve member to further partly resiliently flatten the bends in the sleeve member and seal the holes about the fastener.

8. The method of claim 7 wherein step (b) includes expanding the side wall of the sleeve member with the bearing section of the blind fastener without forming an opening through the side wall of the sleeve member.

9. The method of claim 8 wherein step (b) includes expanding that portion of the sleeve member within the holes sufficiently to substantially flatten the bends in the side wall of the sleeve member.

10. The method of claim 3 further including the step of applying a sealant to the inside of the sleeve member prior to step (a).

* * * * *